US011152994B1

(12) United States Patent
Yang et al.

(10) Patent No.: US 11,152,994 B1
(45) Date of Patent: Oct. 19, 2021

(54) COMMUNICATION OF CHANNEL STATE INFORMATION (CSI) IN WIRELESS NETWORKS

(71) Applicant: Apple Inc., Cupertino, CA (US)

(72) Inventors: Weidong Yang, San Diego, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Ismael Gutierrez Gonzalez, Sunnyvale, CA (US); Wei Zeng, Cupertino, CA (US); Wei Zhang, Cupertino, CA (US); Yuchul Kim, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/884,762

(22) Filed: May 27, 2020

(51) Int. Cl.
*H04B 7/02* (2018.01)
*H04B 7/06* (2006.01)
*H04B 7/0413* (2017.01)

(52) U.S. Cl.
CPC ......... *H04B 7/0626* (2013.01); *H04B 7/0413* (2013.01)

(58) Field of Classification Search
CPC ........................... H04B 7/0626; H04B 7/0413
USPC ......................................................... 375/267
See application file for complete search history.

(56) References Cited

U.S. PATENT DOCUMENTS

| 2007/0155433 | A1* | 7/2007 | Ito ........................ | H04B 7/0854 455/562.1 |
| 2014/0003272 | A1* | 1/2014 | Benjebbour ......... | H04B 7/0639 370/252 |
| 2015/0124769 | A1* | 5/2015 | Zhang .................. | H04B 7/0634 370/329 |
| 2018/0270727 | A1* | 9/2018 | Kim ...................... | H04W 36/14 |
| 2020/0343961 | A1* | 10/2020 | Miao .................... | H04B 7/0626 |

* cited by examiner

*Primary Examiner* — Don N Vo
(74) *Attorney, Agent, or Firm* — Sterne, Kessler, Goldstein & Fox P.L.L.C.

(57) ABSTRACT

The systems, methods, and apparatuses can receive one or more communication signals traversing through a communication channel. The systems, methods, and apparatuses can estimate one or more known parameters, characteristics, and/or attributes of the communication channel, for example, scattering, fading, and/or power decay over distance, through a process referred to as channel estimation. The systems, methods, and apparatuses can develop various channel coefficients, for example, amplitudes and/or phases, describing the channel response of the communication channel at discrete intervals of time, also referred to as taps. The systems, methods, and apparatuses can assign taps to various priorities and, thereafter, utilize these priorities to selectively include their corresponding channel coefficients in a CSI report or exclude their corresponding channel coefficients from the CSI report.

20 Claims, 7 Drawing Sheets

COMMUNICATION OF CHANNEL STATE INFORMATION (CSI) IN WIRELESS NETWORKS

BACKGROUND

Field of Disclosure

The described embodiments generally relate to communication of channel state information (CSI) in multiple-input and multiple-output (MIMO) networks, including 5G MIMO wireless networks.

Related Art 5G is the fifth generation wireless technology standardized the usage of multiple-input and multiple-output (MIMO) networks, in particular massive MIMO networks, for wireless networks. MIMO and massive MIMO use multiple communication beams to exploit multipath propagation to multiply the capacity of these beams. MIMO networks typically include two or four antennas while massive MIMO networks typically include a larger number of antennas, for example, tens or even hundreds of antennas.

SUMMARY

Some embodiments of this disclosure can include a method for communicating channel state information (CSI). The method includes receiving a communication signal traversing through a communication channel; developing channel coefficients describing a channel response of the communication channel at discrete intervals of time; assigning the channel coefficients to corresponding priorities; selectively including or excluding channel coefficients from among the channel coefficients into a CSI report based upon the corresponding priorities; and transmitting the CSI report.

In some embodiments, the assigning can include assigning a most significant channel coefficient from among the channel coefficients to a highest priority from among the priorities and assigning other channel coefficients from among the channel coefficients to other priorities from among the priorities based upon their corresponding tap distance from a most significant tap of the most significant channel coefficient.

In some embodiments, channel coefficients from among the channel coefficients having tap distances further away from the most significant tap of the most significant channel coefficient can be assigned to lower priorities from among the priorities when compared to coefficients from among the channel coefficients having tap distances closer to the most significant tap of the most significant channel coefficient.

In some embodiments, the assigning other channel coefficients can include executing a prioritization algorithm to assign the corresponding priorities to channel coefficients from among the channel coefficients having tap distances equidistant to the most significant tap of the most significant channel coefficient.

In some embodiments, the channel coefficients having tap distances equidistant to the most significant tap of the most significant channel coefficient can include a first channel coefficient whose tap is prior to the most significant tap of the most significant channel coefficient and a second channel coefficient whose tap is after the most significant tap of the most significant channel coefficient. In some embodiments, the prioritization algorithm can assign the first channel coefficient to a higher priority than the second channel coefficient. In some embodiments, the prioritization algorithm can assign the first channel coefficient to a lower priority than the second channel coefficient.

In some embodiments, the selectively including or excluding can include: selecting a channel coefficient from among the channel coefficients; determining whether sufficient resources are available in a resource allocation for the CSI report to include the channel coefficient in the CSI report; including the channel coefficient in the CSI report when the sufficient resources are available; and excluding the channel coefficient from the CSI report when the sufficient resources are not available.

Some embodiments can include User Equipment (UE) for communicating channel state information (CSI). The UE can include physical layer (PHY) circuitry and processor circuitry. The PHY circuitry can receive, from a radio access network (RAN), a communication signal traversing through a communication channel. The processor circuitry can develop channel coefficients describing a channel response of the communication channel at discrete intervals of time, assign the channel coefficients to corresponding priorities, and selectively include or exclude channel coefficients from among the channel coefficients into a CSI report based upon the corresponding priorities. The PHY circuitry can transmit the CSI report to the RAN.

In some embodiments, the processor circuitry is can assign a most significant channel coefficient from among the channel coefficients to a highest priority from among the priorities, and assign other channel coefficients from among the channel coefficients to other priorities from among the priorities based upon their corresponding tap distance from a most significant tap of the most significant channel coefficient.

In some embodiments, channel coefficients from among the channel coefficients having tap distances further away from the most significant tap of the most significant channel coefficient can be assigned to lower priorities from among the priorities when compared to coefficients from among the channel coefficients having tap distances closer to the most significant tap of the most significant channel coefficient.

In some embodiments, the processor circuitry can execute a prioritization algorithm to assign the corresponding priorities to channel coefficients from among the channel coefficients having tap distances equidistant to the most significant tap of the most significant channel coefficient.

In some embodiments, channel coefficients having tap distances equidistant to the most significant channel coefficient can include a first channel coefficient whose tap is prior to a most significant tap of the most significant channel coefficient and a second channel coefficient whose tap is after the most significant tap of the most significant channel coefficient. In some embodiments, the prioritization algorithm can assign the first channel coefficient to a higher priority than the second channel coefficient. In some embodiments, the prioritization algorithm is configured can assign the first channel coefficient to a lower priority than the second channel coefficient.

In some embodiments, the processor circuitry can select a channel coefficient from among the channel coefficients; determine whether sufficient resources are available in a resource allocation for the CSI report to include the channel coefficient in the CSI report; include the channel coefficient in the CSI report when the sufficient resources are available; and exclude the channel coefficient from the CSI report when the sufficient resources are not available.

Some embodiments can include a system for communicating channel state information (CSI). The system can include a radio access network (RAN) and User Equipment (UE). The RAN can provide a communication signal that traverses through a communication channel. The UE can develop channel coefficients describing a channel response of the communication channel at discrete intervals of time, assign the channel coefficients to corresponding priorities, selectively include or exclude channel coefficients from among the channel coefficients into a CSI report based upon the corresponding priorities, and transmit the CSI report to the RAN.

In some embodiments, the UE can assign a most significant channel coefficient from among the channel coefficients to a highest priority from among the priorities, and assign other channel coefficients from among the channel coefficients to other priorities from among the priorities based upon their corresponding tap distance from a most significant tap of the most significant channel coefficient.

In some embodiments, channel coefficients from among the channel coefficients having tap distances further away from the most significant tap of the most significant channel coefficient can be assigned to lower priorities from among the priorities when compared to coefficients from among the channel coefficients having tap distances closer to the most significant tap of the most significant channel coefficient.

In some embodiments, the UE can execute a prioritization algorithm to assign the corresponding priorities to channel coefficients from among the channel coefficients having tap distances equidistant to the most significant channel coefficient.

In some embodiments, the channel coefficients having tap distances equidistant to the most significant channel coefficient can include a first channel coefficient whose tap is prior to a most significant tap of the most significant channel coefficient and a second channel coefficient whose tap is after the most significant tap of the most significant channel coefficient. In some embodiments, the prioritization algorithm is configured to assign the first channel coefficient to a higher priority than the second channel coefficient. In some embodiments, the prioritization algorithm is configured to assign the first channel coefficient to a lower priority than the second channel coefficient.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1:
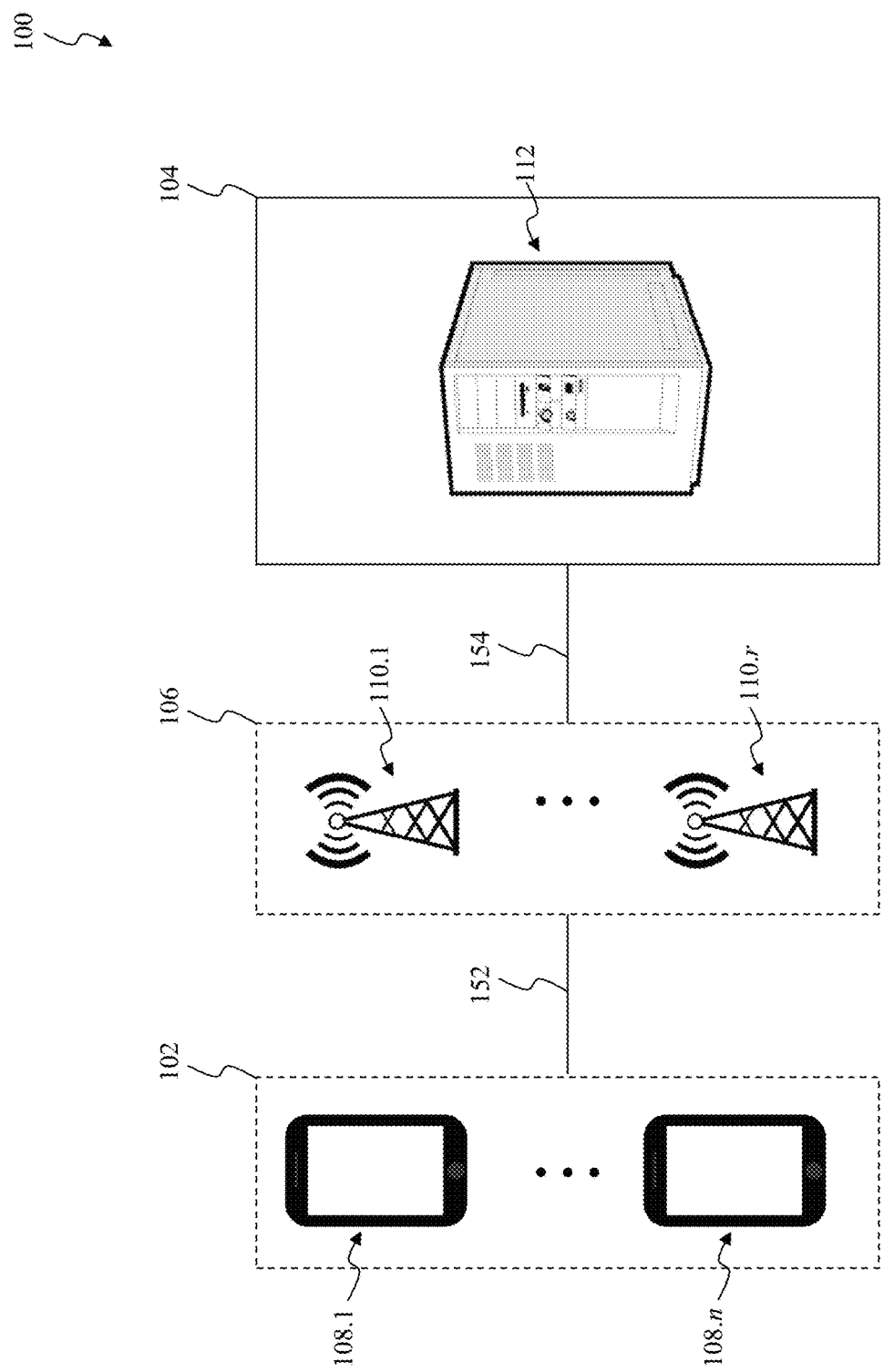
FIG. 1 graphically illustrates an exemplary wireless network in accordance with various embodiments.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The systems, methods, and apparatuses, to be described in further detail below, can receive one or more communication signals traversing through a communication channel. The systems, methods, and apparatuses can estimate one or more known parameters, characteristics, and/or attributes of the communication channel, for example, scattering, fading, and/or power decay over distance, through a process referred to as channel estimation. The systems, methods, and apparatuses can develop various channel coefficients, for example, amplitudes and/or phases, describing the channel response of the communication channel at discrete intervals of time, also referred to as taps. The systems, methods, and apparatuses can assign taps to various priorities and, thereafter, utilize these priorities to selectively include their corresponding channel coefficients in a CSI report or exclude their corresponding channel coefficients from the CSI report.

Exemplary Wireless Networks for Communicating Channel State Information (CSI)

FIG. 1 graphically illustrates an exemplary wireless network in accordance with various embodiments. An exemplary wireless network 100, as to be described in further detail below, can operate in conjunction with the Long-Term Evolution (LTE) system standards and Fifth Generation (5G) or NR system standards as provided by Third Generation Partnership Project (3GPP) technical specifications. However, those skilled in the relevant art(s) will recognize that the teachings herein are similarly applicable to other networks that benefit from the principles described herein, such as, future 3GPP systems (e.g., Sixth Generation (6G)) systems, and/or IEEE 802.16 protocols (e.g., WLAN, WiMAX, etc.) to provide some examples. In the exemplary embodiment illustrated in FIG. 1, the exemplary wireless network 100 includes User Equipment (UE) 102 communicatively coupled to a core network (CN) 104 via a radio access network (RAN) 106.

In the exemplary embodiment illustrated in FIG. 1, the UE 102 can include one or more electronic devices 108.1 through 108.n, namely, handheld touchscreen mobile computing devices connectable to one or more cellular networks. Generally, the electronic devices 108.1 through 108.n can include any mobile or non-mobile electrical, mechanical, and/or electro-mechanical computing device. These computing devices can include consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine-Type-Communication (MTC) devices, Machine-to-Machine (M2M) devices, and/or Internet of Things (IoT) devices to provide some examples.

In the exemplary embodiment illustrated in FIG. 1, the RAN 106 can be implemented as a Next Generation (NG) RAN or a 5G RAN, an evolved Universal Terrestrial Radio Access Network (E-UTRAN), or a legacy RAN, such as a UTRAN or GSM EDGE Radio Access Network (GERAN). As used herein, the term "NG RAN," or the like, may refer to a RAN 106 that operates in an NR or 5G system 300, and the term "E-UTRAN," or the like, may refer to a RAN 106 that operates in an LTE or 4G system 300. As illustrated in FIG. 1, the UE 102 can be configured to connect, for example, communicatively couple, with the RAN 106. In the exemplary embodiment illustrated in FIG. 1, the electronic devices 108.1 through 108.n utilize a communication channel 152 to communicate with the RAN 106. In an exemplary embodiment, the communication channel 152 can be used to provide communication between the UE 102 and the RAN 106 in accordance with cellular communications protocols, such as a Global System for Mobile Communications (GSM) protocol, a Code-Division Multiple Access (CDMA) network protocol, a Push-to-Talk (PTT) protocol, a Push-to-Talk over Cellular (POC) protocol, a Universal Mobile Telecommunications System (UMTS) protocol, a 3GPP LTE protocol, a 5G protocol, and/or a NR protocol to provide some examples. In the exemplary embodiment illustrated in FIG. 1, the communication channel 152 can include one or more downlink communication channels, for example, a Physical Downlink Control Channel (PDCCH) and/or a Physical Downlink Shared Channel (PDSCH), and/or one or more uplink communication channels, for example, a Physical Uplink Control Channel (PUCCH) and/or a Physical Uplink Shared Channel (PUSCH). In this exemplary embodiment, the PDCCH and the PUCCH represent downlink and uplink control channels, respectively, that carry control information between the UE 102 and the RAN 106. In this exemplary embodiment, the PDSCH and the PUSCH represent downlink and uplink control channels, respectively, that carry data information between the UE 102 and the RAN 106. As used herein, the term "downlink" refers to the direction from the RAN 106 to the UE 102. The term "uplink" refers to the direction from the UE 102 to the RAN 106.

In an exemplary embodiment, the communication channel 152 can be implemented using a downlink resource grid and/or an uplink resource grid for downlink transmissions and uplink transmissions, respectively, between the UE 102 and the RAN 106. In this exemplary embodiment, the downlink resource grid and/or the uplink resource grid can be a time-frequency grid, called a resource grid or time-frequency resource grid, which is the physical resource in each slot. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RB) that describe the mapping of certain physical channels to resource elements (REs).

As illustrated in FIG. 1, the RAN 106 can include one or more access nodes (ANs) 110.1 through 110.r to communicatively couple the UE 102 and the CN 104. As used herein, the terms "access node," "access point," or the like can describe equipment that provides the radio baseband functions for data and/or voice connectivity between the UE 102 and the CN 104. These access nodes can be referred to as base stations (BSs), Next Generation Node Bs (gNBs), RAN nodes, evolved NodeB (eNBs), NodeBs, Road Side Units (RSUs), and/or Transmission Reception Points (TRxPs or TRPs) to provide some examples. In some embodiments, the one or more ANs 110.1 through 110.r can be implemented as ground stations (e.g., terrestrial access points) and/or satellite stations providing coverage within a geographic area, also referred to as a cell. For example, the one or more ANs 110.1 through 110.r can provide coverage over a wide geographic area, such as a few kilometers, to form a macrocell or coverage over smaller geographic areas to form a small cell, such as microcell which is less than two kilometers wide, a picocell which is 200 meters or less wide, or a femtocell which is on the order of 10 meters.

As illustrated in FIG. 1, the RAN 106 utilizes a communication interface 154 to communicate with the CN 104. In an exemplary embodiment, the communication interface 154 can be split into an interface, which carries data information, between the CN 104 and the RAN 106, and another interface, which carries control information, between the CN 104 and the RAN 106. In the exemplary embodiment illustrated in FIG. 1, the CN 104 can include one or more network elements 112 which are configured to offer various data and telecommunications services to customers/subscribers of to the CN 104. In some embodiments, the CN 104 can be implemented as one physical node or as separate physical nodes including components to read and execute instructions from a machine-readable or computer-readable medium (e.g., a non-transitory machine-readable storage medium).

Figure 2:
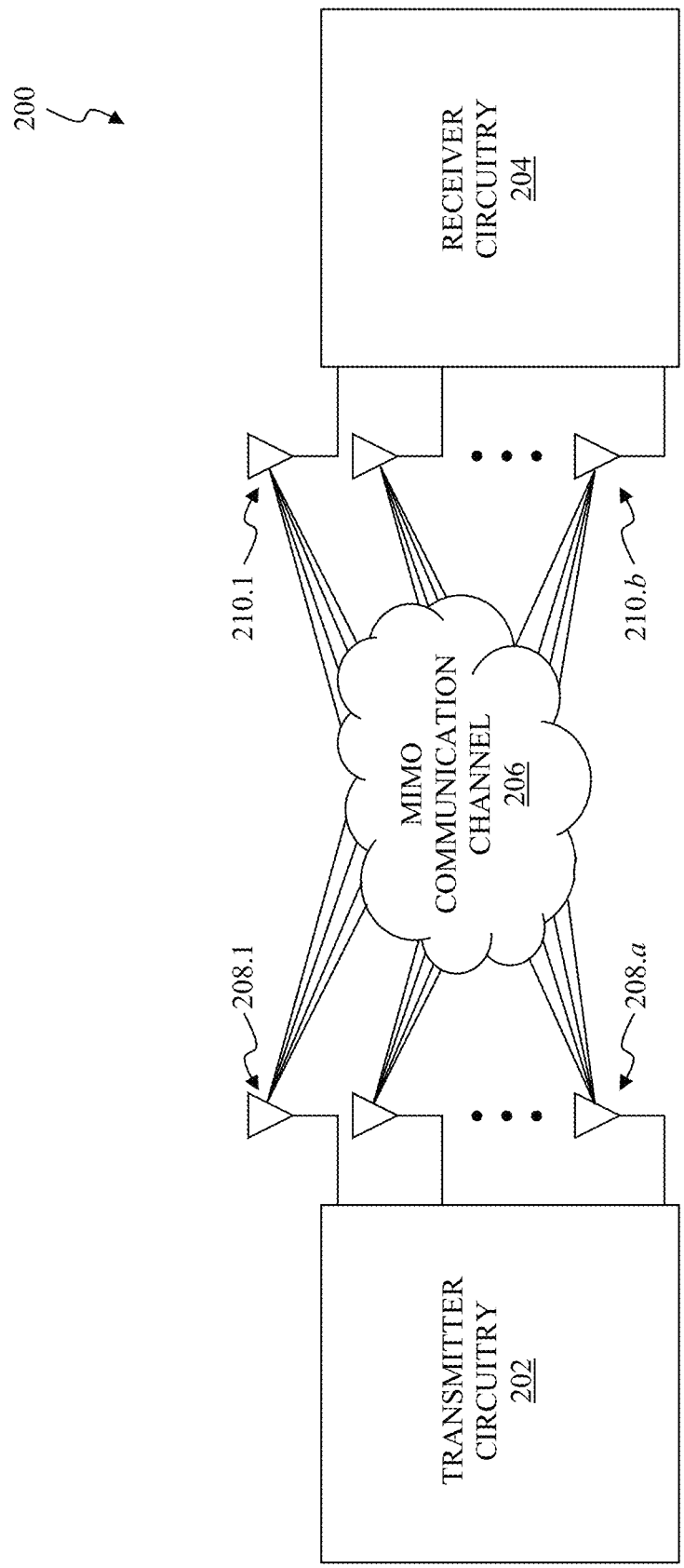
FIG. 2 graphically illustrates an exemplary multiple-input and multiple-output (MIMO) transmitter-receiver combination within the exemplary wireless network in accordance with various embodiments.

The UE 102 and/or the RAN 106, as described above in FIG. 1, can be implemented using multiple-input and multiple-output (MIMO) technology. It is beneficial for the UE 102 and/or the RAN 106 to access channel state information (CSI) to proactively adapt their transmissions to the communication channel 152. FIG. 2 graphically illustrates an exemplary multiple-input and multiple-output (MIMO) transmitter-receiver combination within the exemplary wireless network in accordance with various embodiments. In the exemplary embodiment illustrated in FIG. 2, a transmitter-receiver combination 200 includes transmitter circuitry 202 communicatively coupled to receiver circuitry 204 via a multiple-input and multiple-output (MIMO) communication channel 206. In this exemplary embodiment, the transmitter circuitry 202 can be implemented as part of one or more of the one or more access nodes (ANs) 110.1 through 110.r with the RAN 106 and the receiver circuitry 204 can be implemented as part of one or more of the electronic devices 108.1 through 108.n within the UE 102 as described above in FIG. 1. As such, the MIMO communication channel 206 can represent an exemplary embodiment of the communication channel 152.

In the exemplary embodiment illustrated in FIG. 2, the transmitter circuitry 202 includes transmitting antennas 208.1 through 208.a and the receiver circuitry 204 includes receiving antennas 210.1 through 210.b. As illustrated in FIG. 2, the transmitter circuitry 202 transmits various communication signals via the transmitting antennas 208.1 through 208.a. These communication signals traverse various communication pathways as they traverse through the MIMO communication channel 206 where they are observed by the receiving antennas 210.1 through 210.b. Various environmental factors, such as atmospheric ducting, ionospheric reflection and refraction, and/or reflection from water bodies and terrestrial objects such as mountains and buildings to provide some examples, can cause these communication pathways to differ. This multipath propagation of these communication signals can cause multipath interference, including constructive and destructive interference between these communication pathways, and/or phase shifting of these communication signals. In the exemplary embodiment illustrated in FIG. 2, the transmitter circuitry 202 can proactively adapt, for example, pre-code, these communication signals in accordance with various channel coefficients to accommodate for this multipath propagation.

In an exemplary embodiment, the transmitter circuitry 202 and the receiver circuitry 204 undergo a feedback procedure to develop channel state information (CSI) for use in pre-coding the communication signals. As illustrated in FIG. 2, the receiver circuitry 204 estimates one or more known parameters, characteristics, and/or attributes of the MIMO communication channel 206, for example, scattering, fading, and/or power decay over distance, through a process referred to as channel estimation and, thereafter, returns the estimates of these known parameters, characteristics, and/or attributes as channel state information (CSI) in a CSI report to the transmitter circuitry 202. Generally, the CSI report can include various channel coefficients, for example, amplitudes and/or phases, describing the channel response of the MIMO communication channel 206 at discrete intervals of time, also referred to as taps. In an exemplary embodiment, the CSI report can include one or more of a channel-quality indicator (CQI), a precoder-matrix indicator (PMI), a Channel-State Information Resource Indicator (CRI), a Synchronization Signal Block Resource Indicator (SSBRI), a Layer Indicator (LI), a Rank Indicator (RI), and/or a Layer 1 reference signal received power (L1-RSRP) to provide some examples. The transmitter circuitry 202 can utilize the CSI report to estimate the propagation, for example, scattering, fading, and/or power decay over distance, of communication signals traversing through the MIMO communication channel 206. For example, and referring back to FIG. 1, the RAN 106 can utilize the CSI report to estimate the propagation of DL communication signals from the RAN 106 to the UE 102 traversing through the communication channel 152 and/or UL communication signals from the UE 102 to the RAN 106 traversing through the communication channel 152. Alternatively, or in addition, the RAN 106 can derive the propagation of UL communication signals from the UE 102 to the RAN 106 based on the propagation of DL communication signals from the RAN 106 to the UE 102.

Referring back to FIG. 1 above, the RAN 106 can trigger the UE 102 to provide the CSI report of the propagation of communication signals traversing through the communication channel 152. As described above in FIG. 1, the communication channel 152 can include the PDCCH, the PDSCH, the PUCCH, and/or the PUSCH. In the exemplary embodiment illustrated in FIG. 1, the UE 102 can provide the CSI report using Uplink Control Information (UCI) on the PUCCH or the PUSCH. In the exemplary embodiment illustrated in FIG. 1, when the RAN 106 triggers the UE 102 to provide the CSI report, the RAN 106 allocates resources, for example, resource elements (REs), within the uplink resource grid of the PUCCH or the PUSCH to be utilized by the UE 102 to provide the CSI report.

Resource Allocation for Communicating CSI Reports

Figure 3:
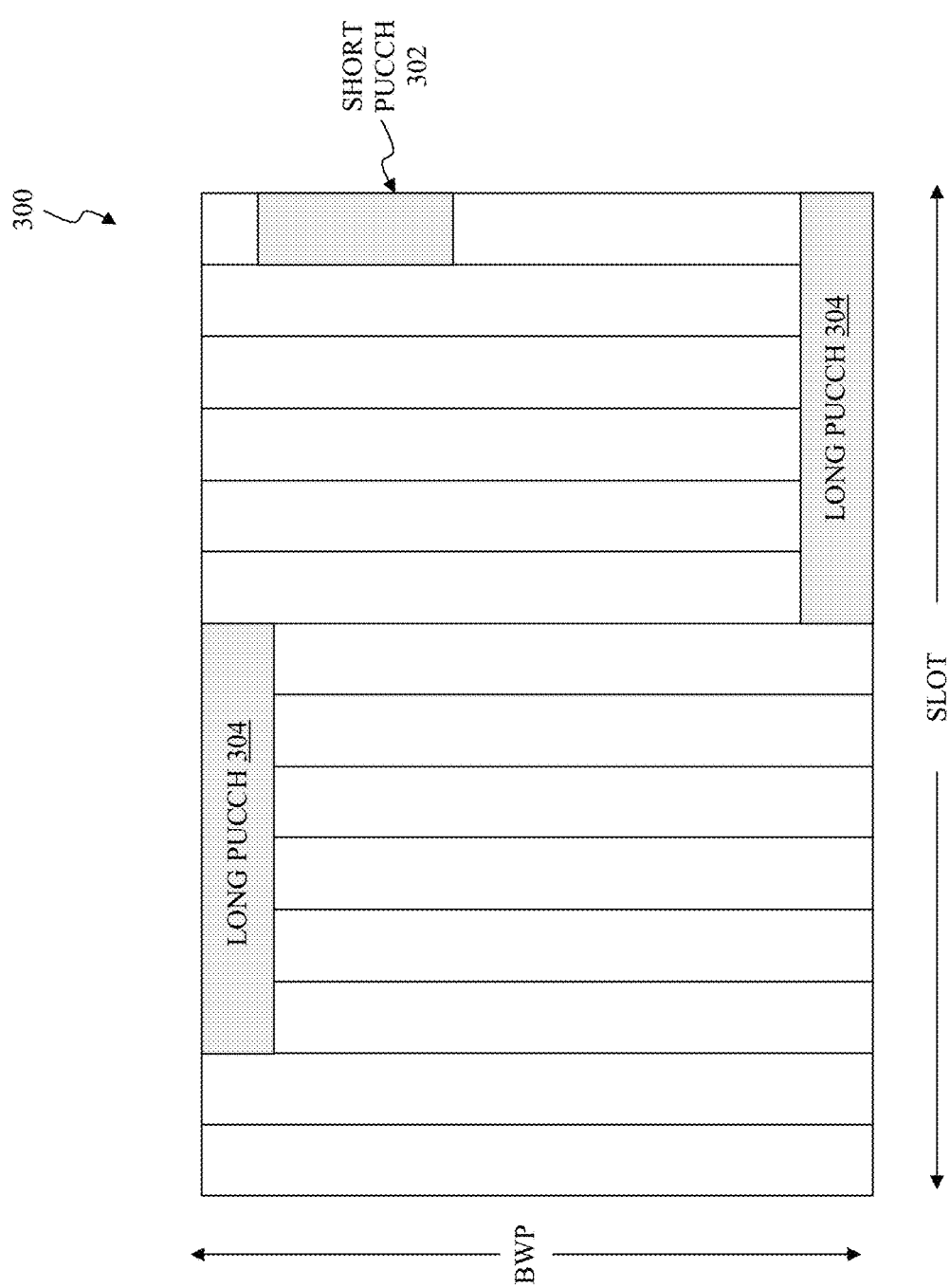
FIG. 3 graphically illustrates an exemplary resource allocation for communicating channel state information (CSI) reports within the exemplary wireless network in accordance with various embodiments.

FIG. 3 graphically illustrates an exemplary resource allocation for communicating channel state information (CSI) reports within the exemplary wireless network in accordance with various embodiments. In the exemplary embodiment illustrated in FIG. 1 as described above, the RAN 106 allocates resources within the uplink resource grid of the PUCCH to be utilized by the UE 102 to provide the CSI report. An exemplary uplink resource grid 300 is illustrated in FIG. 3 in terms of Bandwidth Parts (BWPs) and slots. As illustrated in FIG. 3, the exemplary uplink resource grid 300 includes PUCCH for transporting UCI (Uplink Control Information (UCI), such as Hybrid Automatic Repeat Request (HARD) feedback, Channel State Information (CSI), and/or Scheduling Request (SRs) to provide some examples. In NR, the PUCCH can utilize five (5) different PUCCH formats for transporting the UCI. For example, as illustrated in FIG. 3, the exemplary uplink resource grid 300 of the PUCCH can include short PUCCH 302 and/or long PUCCH 304. The short PUCCH 302, as illustrated in FIG. 3, typically occupies one (1) or two (2) OFDM symbols whereas the long PUCCH 304 typically occupies four (4) to fourteen (14) OFDM symbols.

In the exemplary embodiment illustrated in FIG. 3, the RAN 106 allocates resources within the exemplary uplink resource grid 300 based upon a CSI Feedback Rank of the UE 102. Generally, the CSI Feedback Rank indicates a mode of transmission for the UE 102. Single-user MIMO (SU-MIMO) is the ability of the UE 102 to provide the CSI report in one or more data streams, referred to as spatial layers, from a single transmitting antenna, such as one of the transmitting antennas 208.1 through 208.a as described above in FIG. 2, to a single access node (AN), such as one of the one or more ANs 110.1 through 110.r as described above in FIG. 1, included within the RAN 106. Typically, the number of spatial layers that the UE 102 can support is referred to as a Rank of the UE 102. For example, a CSI Feedback Rank 1 indicates the UE 102 is to provide the CSI report to the single AN using a single antenna port, for example one of the transmitting antennas 208.1 through 208.a as described above in FIG. 2. In CSI Feedback Rank 1, the UE 102 simultaneously provides the CSI report in multiple spatial layers in a single transmission beam to the single AN using the same time and frequency resources. In the exemplary embodiment illustrated in FIG. 1, the RAN 106 assumes that the UE 102 is to provide CSI Feedback Rank 1 and, thereafter, allocates the resources within the uplink resource grid of the PUCCH or the PUSCH accordingly. However, in multi-user MIMO (MU-MIMO), the UE 102 can provide the CSI report in the one or more data streams from multiple transmitting antenna, such as two or more of the transmitting antennas 208.1 through 208.a as described above in FIG. 2, to a multiple ANs, such as two or more of the one or more ANs 110.1 through 110.r as described above in FIG. 1, included within the RAN 106. For example, a CSI Feedback Rank 2 indicates the UE 102 is to provide the CSI report to two ANs using two antenna ports, for example, two of the transmitting antennas 208.1 through 208.a as described above in FIG. 2. In CSI Feedback Rank 2, the UE 102 simultaneously provides the CSI report in multiple spatial layers in two transmission beams to the two ANs using the same time and frequency resources.

As illustrated in FIG. 3, the RAN 106 allocates slots in the short PUCCH 302 and/or the long PUCCH 304 to enable the UE 102 to provide m-bits of CSI Feedback Rank 1. In the exemplary embodiment illustrated in FIG. 3, the RAN 106 allocates the allocated resources 302 in the uplink resource grid 300 based on an assumption that the UE 102 is to provide CSI Feedback Rank 1. Thereafter, the UE 102 can provide CSI Feedback Rank 1 using the allocated resources 302 in the uplink resource grid 300. Moreover, the UE 102 can alternatively, or additionally, provide n-bits of CSI Feedback Rank 2 with the n-bits of CSI Feedback Rank 2 including more bits than the m-bits of CSI Feedback Rank 1. As such, the UE 102 cannot provide CSI Feedback Rank 2 using the allocated slots in the short PUCCH 302 and/or the long PUCCH 304. In this situation, the UE 102 can perform an omission procedure to omit some of the CSI from CSI Feedback Rank 2 to effectively truncate the CSI Feedback Rank 2 to occupy the allocated slots in the short PUCCH 302 and/or the long PUCCH 304.

Exemplary Channel State Information (CSI)

Figure 4:
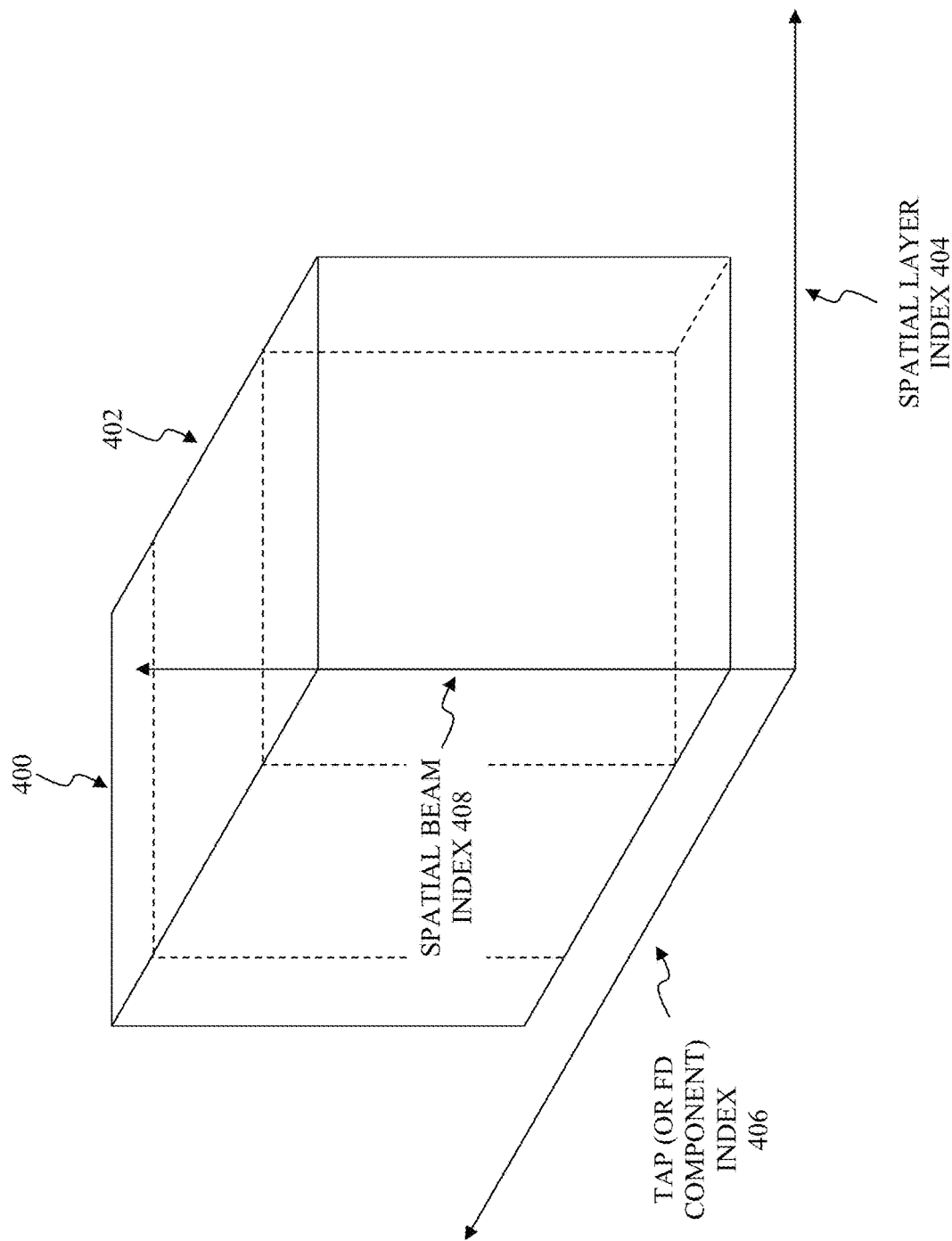
FIG. 4 graphically illustrates an exemplary channel state information (CSI) in accordance with various embodiments.

FIG. 4 graphically illustrates an exemplary channel state information (CSI) in accordance with various embodiments. As described above in FIG. 2, the UE 102 can estimate one or more known parameters, characteristics, and/or attributes of a communication channel, for example, the communication channel 152 and/or the MIMO communication channel 206, to provide channel state information (CSI) 400. As illustrated in FIG. 4, the CSI 400 can be graphically represented in a three-dimensional coordinate system, such as a Cartesian coordinate system. In the exemplary embodiment illustrated in FIG. 4, an x-axis of this Cartesian coordinate system corresponds to a spatial layer index 404, a y-axis of this Cartesian coordinate system corresponds to a tap (or frequency domain (FD) component) index 406, and a z-axis of this Cartesian coordinate system corresponds to a spatial beam index 408. As described above in FIG. 3, the UE 102 can receive one or more data streams, referred to as spatial layers, over one or more transmission beams from one or more ANs, such as one or more of the one or more ANs 110.1 through 110.r as described above in FIG. 1, included within the RAN 106. Each of these spatial layers can be graphically represented by the spatial layer index 404 in FIG. 4. And as described above in FIG. 2, the UE 102 can estimate one or more known parameters, characteristics, and/or attributes of the communication channel. For example, the one or more known parameters, characteristics, and/or attributes of the communication channel can include a power delay profile which quantifies the signal intensity of the one or more transmission beams received over the communication channel as a function of propagation delays. In the exemplary embodiment illustrated in FIG. 4, various channel coefficients, for example, amplitudes and/or phases, describing these known parameters, characteristics, and/or attributes of the communication channel can be graphically represented by the spatial beam index 408 over discrete intervals in time and/or frequency. These intervals in time and/or frequency can be graphically represented by the tap (or FD component) index 406 in FIG. 4.

In the exemplary embodiment illustrated in FIG. 4, the UE 102 can perform an exemplary CSI omission procedure to include some of the channel coefficients of the CSI 400 and exclude other channel coefficients of the CSI 400 to effectively truncate the CSI 400 to develop a compact CSI 402 to be reported to the AN 106. As described above in FIG. 3, the AN 106 allocates resources within the uplink resource grid to the UE 102 for reporting the CSI 400 and/or the compact CSI 402 to the AN 106. The UE 102 can effectively partition this resource allocation among spatial layers to allow the UE 102 to report channel coefficients for these spatial layers. In an exemplary embodiment, the UE 102 can partition the resource allocation equally among the spatial layers. Otherwise, the UE 102 can partition the resource allocation unequally among the spatial layers and allocate more resources to more significant spatial layers among the spatial layers, such as those spatial layers providing live video and/or audio to provide some examples. Thereafter, the UE 102 can selectively include some of the corresponding channel coefficients from the CSI 400 for these spatial layers or selectively exclude other corresponding channel coefficients from the CSI 400 for these spatial layers to utilize the resources allocated to these spatial layers to provide the compact CSI 402. In an exemplary embodiment, the UE 102 can assign taps (or FD components) from the tap (or FD component) index 406 to various priorities. In this exemplary embodiment, the UE 102 can utilize these priorities to selectively include their corresponding channel coefficients in the compact CSI 402 or exclude their corresponding channel coefficients from the compact CSI 402.

Exemplary Channel Coefficient Priorities

Figure 5:
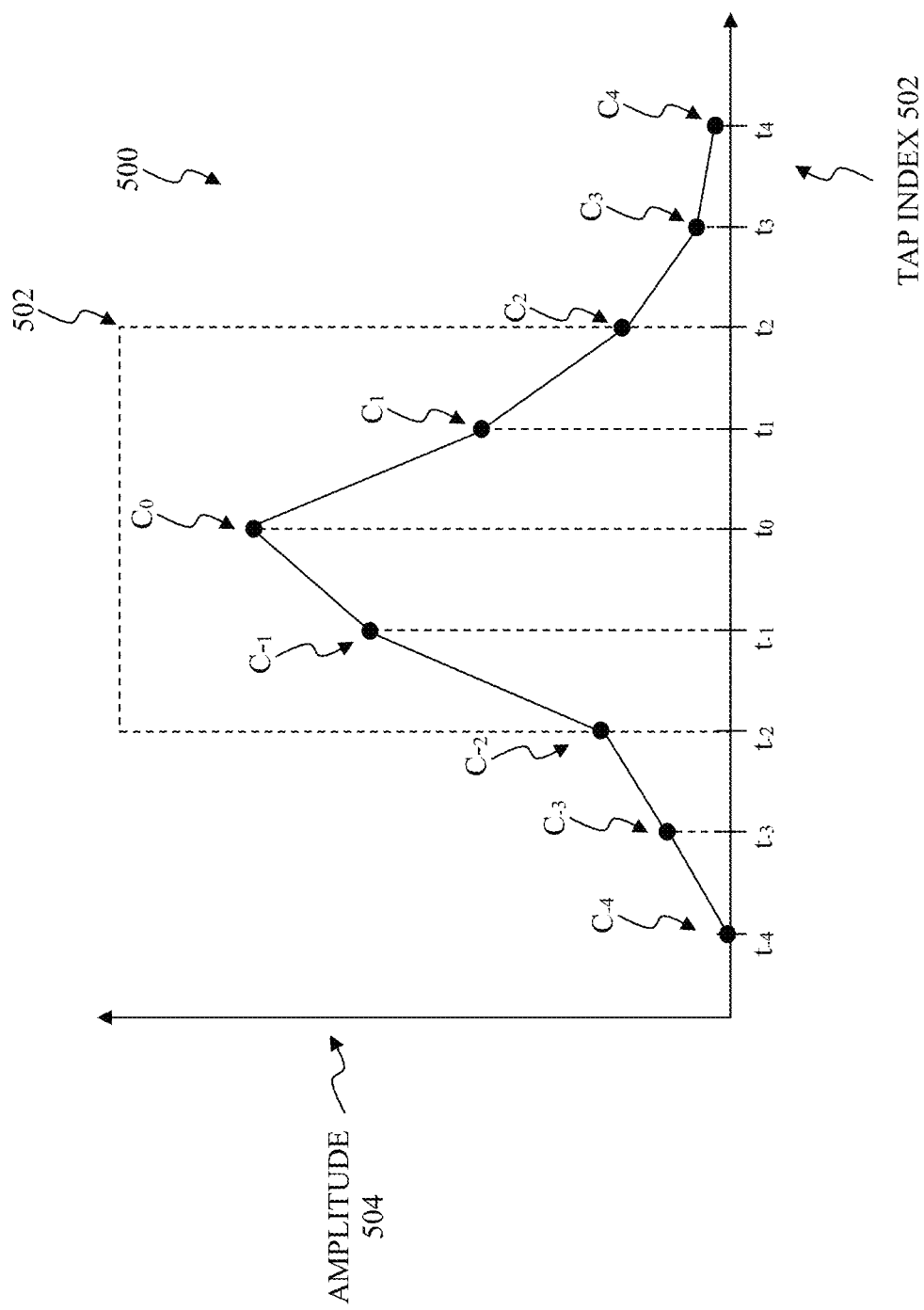
FIG. 5 graphically illustrates an exemplary wireless channel power delay profile of an exemplary spatial layer in accordance with various embodiments.

FIG. 5 graphically illustrates an exemplary wireless channel power delay profile of an exemplary spatial layer in accordance with various embodiments. As described above in FIG. 2, the UE 102 can estimate one or more known parameters, characteristics, and/or attributes of a single data stream, or a single spatial layer, traversing through a communication channel, for example, the communication channel 152 and/or the MIMO communication channel 206. One such known parameter, characteristic, and/or attributes of the communication channel is an exemplary wireless channel power delay profile 500 as illustrated in FIG. 5. As illustrated in FIG. 5, the exemplary wireless channel power delay profile 500 for the single data stream, or the single spatial layer, can be graphically represented in a two-dimensional coordinate system, such as the Cartesian coordinate system as described above in FIG. 4. In the exemplary embodiment illustrated in FIG. 5, the x-axis of this Cartesian coordinate system corresponds to a tap index 502 for the wireless channel power delay profile 500 and the y-axis of this Cartesian coordinate system corresponds to amplitudes 504 of the wireless channel power delay profile 500.

The UE 102 estimates the one or more known parameters, characteristics, and/or attributes of the single data stream, or the spatial layer, traversing through the communication channel to develop channel coefficients $C_1$ through $C_x$ at discrete intervals in time. In this exemplary embodiment, channel coefficients $C_1$ through $C_x$ can include amplitudes and/or phases of one or more communication signals, for example, a demodulation reference signal (DMRS), a phase-tracking reference signal (PTRS), a sounding reference signal (SRS), or a channel-state information reference signal (CSI-RS), received from the AN 106 within the single data stream, or the single spatial layer, at the discrete intervals in time. The channel coefficients $C_1$ through $C_x$ are not shown in FIG. 5. Rather, as illustrated in FIG. 5, the UE 102 can normalize the channel coefficients $C_1$ through $C_x$ such that the channel coefficient from among the channel coefficients $C_1$ through $C_x$ having the largest amplitude has been normalized to the channel coefficient $C_0$ and its corresponding interval in time has been normalized to a tap $t_0$ from the tap index 502 to provide the channel coefficients $C_{-4}$ through $C_4$ and the taps $t_{-4}$ through $t_4$ as illustrated in FIG. 5. The amplitudes of these channel coefficients $C_{-4}$ through $C_4$ are only illustrated in FIG. 5 to simplify the discussion of the exemplary omission procedures to follow.

In the exemplary embodiment illustrated in FIG. 5, the channel coefficient $C_0$ having the largest amplitude is characterized as being the most significant channel coefficient from among the channel coefficients $C_{-4}$ through $C_4$. Alternatively, or in addition to, a most significant tap from among the taps $t_{-4}$ through $t_4$ of the tap index 502 can be selected and a channel coefficient from among the channel coefficients $C_{-4}$ through $C_4$ that is associated with this most significant tap can be characterized as being the most significant channel coefficient. For example, the UE 102 selects one of the taps $t_{-4}$ through $t_4$ from the tap index 502 to be the most significant tap and assigns the channel coefficient from among the channel coefficients $C_{-4}$ through $C_4$ associated with this most significant tap $t_0$ be the highest priority. In these exemplary embodiments, the UE 102 can assign the tap $t_0$ as to be the most significant tap and/or the UE 102 can assign the most significant channel coefficient, for example, the channel coefficient $C_0$, to be the highest priority. However, these examples are not limiting. Those skilled in the relevant art(s) will recognize that any of the channel coefficients $C_{-4}$ through $C_4$ can be assigned to be the highest priority without departing from the spirit and scope of the present disclosure As additionally illustrated in FIG. 5, the UE 102 can assign other priorities to remaining channel coefficients from among the channel coefficients $C_{-4}$ through $C_4$ based upon their corresponding tap distance from a most significant tap of the most significant channel coefficient, namely, the tap $t_0$ of the channel coefficient $C_0$. For example, the UE 102 can assign the channel coefficient $C_1$ to be a higher priority than the channel coefficient $C_2$ since the channel coefficient $C_1$ has a closer tap distance to the most significant tap of the most significant channel coefficient than the channel coefficient $C_2$. However, as illustrated in FIG. 5, pairs of adjacent neighboring channel coefficients from among the channel coefficients $C_{-4}$ through $C_4$ at adjacent neighboring taps, for example, channel coefficient $C_{-1}$ at tap $t_{-1}$ and channel coefficient $C_1$ at tap $t_1$ can be characterized as having tap distances equidistant from the most significant tap of the most significant channel coefficient. The UE 102 can assign these pairs of equidistant adjacent neighboring channel coefficients priorities based upon a prioritization algorithm. In an exemplary embodiment, the prioritization algorithm can assign channel coefficients whose taps are after the most significant tap of the most significant channel coefficient, for example, channel coefficient $C_1$, from among these pairs of equidistant adjacent neighboring channel coefficients to higher priorities than channel coefficients whose taps are before the most significant tap of the most significant channel coefficient, for example, channel coefficient $C_{-1}$, from among these pairs of equidistant adjacent neighboring channel coefficients. In this exemplary embodiment, for example, this prioritization algorithm can assign the channel coefficient $C_1$ to have a higher priority than the channel coefficient $C_{-1}$. In another exemplary embodiment, this prioritization algorithm can assign channel coefficients whose taps are after the most significant tap of the most significant channel coefficient, for example, channel coefficient $C_1$, from among these pairs of equidistant adjacent neighboring channel coefficients to lower priorities than channel coefficients whose taps are prior to the most significant tap of the most significant channel coefficient, for example, channel coefficient $C_{-1}$, from among these pairs of equidistant adjacent neighboring channel coefficients. In this other exemplary embodiment, for example, this prioritization algorithm can assign the channel coefficient $C_1$ to have a lower priority than the channel coefficient $C_{-1}$. In some embodiments, for example in a wrap-around situation, a channel coefficient, for example, channel coefficient $C_{-2}$, can be considered as having a tap prior to the tap of the most significant channel coefficient by L1 indices, namely, L1=2 for $t_{-2}$. In these embodiments, this channel coefficient, for example, the channel coefficient $C_{-2}$, can also be considered as having a tap after the tap of the most significant channel coefficient by L2 indices, namely, L2=6 for $t_{-2}$ for the taps $t_{-2}$ through $t_2$ as illustrated in FIG. 5. In these embodiments, if L1 is less than or equal to L2, then the channel coefficient is considered to have a tap prior to the most significant tap of the most significant channel coefficient; otherwise, the channel coefficient is considered to have a tap after the most significant tap of the most significant channel coefficient.

Exemplary Channel State Information (CSI) Omission Procedures

The discussion to follow is to describe various exemplary channel state information (CSI) omission procedures. The exemplary CSI omission procedures to be described in further detail below can be utilized by the UE 102 to report rank 2 Type II CSI feedback to the RAN 106. As described above, the CSI report can include various channel coefficients, for example, amplitudes and/or phases, describing a channel response of a communication channel, for example, the communication channel 152 and/or the MIMO communication channel 206, at discrete intervals of time. As to be described in further detail below, these taps can be assigned to various priorities. The exemplary CSI omission procedures to be described in further detail below can utilize these priorities of these taps to selectively include or exclude their corresponding channel coefficients within the CSI report. This selective omission of these channel coefficients effectively truncates the CSI report. The exemplary CSI omission procedures to be described in further detail below effectively allow rank 2 Type II CSI feedback to be communicated by the UE 102 into resources allocated by the RAN 106 for rank 2 Type I CSI feedback.

Figure 6:
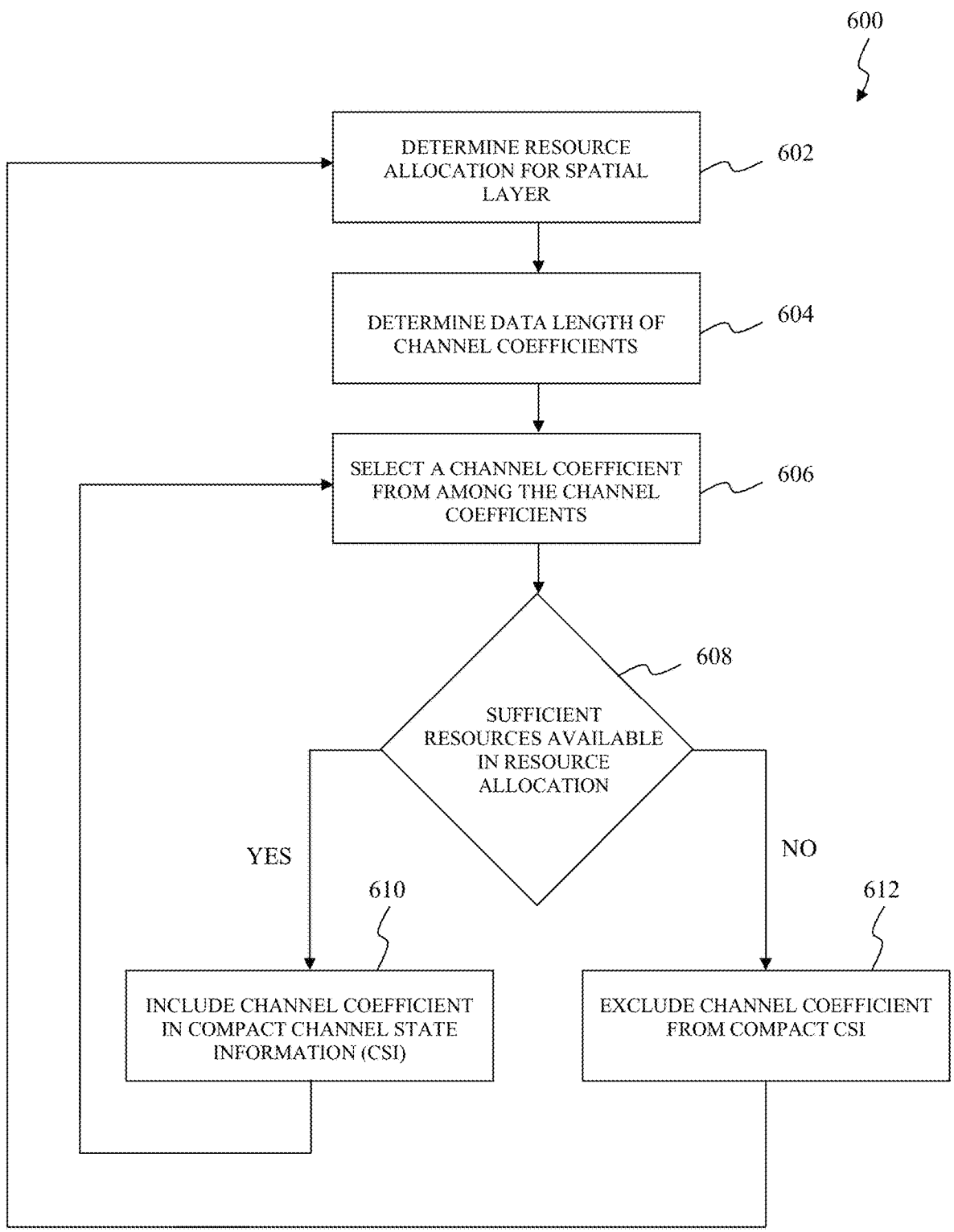
FIG. 6 illustrates a flowchart of an exemplary channel state information (CSI) omission procedure in accordance with various embodiments.

FIG. 6 illustrates a flowchart of an exemplary channel state information (CSI) omission procedure in accordance with various embodiments. The disclosure is not limited to this operational description. Rather, it will be apparent to ordinary persons skilled in the relevant art(s) that other operational control flows are within the scope and spirit of the disclosure. The following discussion describes an exemplary operational control flow 600 for selectively including and/or excluding channel coefficients from channel state information (CSI) to develop compact CSI for a CSI report. The operational control flow 600 can be performed by the UE 102 as described above in FIG. 1.

At operation 602, the operational control flow 600 determines a resource allocation for a spatial layer for reporting channel state information (CSI). As described above in FIG. 3, a radio access network (RAN), such as the RAN 106 as described above in FIG. 1, 106 allocates resources within an uplink resource grid of the PUCCH or the PUSCH to be utilized to provide a CSI report. For example, the RAN can allocate one (1) or two (2) OFDM symbols for a short PUCCH in the uplink resource grid of the PUCCH or four (4) to fourteen (14) OFDM symbols for a long PUCCH in the uplink resource grid of the PUCCH to be utilized to provide a CSI report. The operational control flow 600 determines a size of this resource allocation, for example, in bits, to be utilized to provide the CSI report.

At operation 604, the operational control flow 600 determines a data length, for example, in bits, of channel coefficients in the CSI. The operational control flow 600 can estimate one or more known parameters, characteristics, and/or attributes of a communication channel, for example, the communication channel 152 and/or the MIMO communication channel 206, through a process referred to as channel estimation to develop CSI for the communication channel. The CSI can include various channel coefficients, for example, amplitudes and/or phases, describing a channel response of the communication channel at discrete intervals of time, also referred to as taps. The operational control flow 600 determines a data length, for example, in bits, of these channel coefficients at operation 604.

At operation 606, the operational control flow 600 selects a channel coefficient from among the channel coefficients. In the exemplary embodiment illustrated in FIG. 6, the operational control flow 600 selects the channel coefficient from among the channel coefficients based upon priorities assigned to the channel coefficients. As described above in FIG. 5, the operational control flow 600 can assign a most significant channel coefficient from among the channel coefficients to the highest priority. Thereafter, the operational control flow 600 can assign priorities to other channel coefficients from among the channel coefficients based upon their corresponding tap distance from the most significant tap of the most significant channel coefficient. In situations, when two or more channel coefficients from among the channel coefficients are equidistant from the most significant tap of the most significant channel coefficient, the operational control flow 600 can execute a prioritization algorithm to assign priorities to these channel coefficients. In an exemplary embodiment, the prioritization algorithm can assign channel coefficients whose taps are after the most significant tap of the most significant channel coefficient from among these channel coefficients to higher priorities than channel coefficients whose taps are prior to the most significant tap of the most significant channel coefficient from among these channel coefficients as described above in FIG. 5. In another exemplary embodiment, the prioritization algorithm can assign channel coefficients whose taps are after the most significant tap of the most significant channel coefficient from among these channel coefficients to lower priorities than channel coefficients whose taps are prior to the most significant tap of the most significant channel coefficient from among these channel coefficients as described above in FIG. 5.

At operation 608, the operational control flow 600 determines whether sufficient resources are available in the resource allocation to include the channel coefficient selected in operation 606. The operational control flow 600 compares the resources available in the resource allocation, typically, in bits, with the data length, for example, in bits, of the channel coefficient selected in operation 606. The operational control flow 600 proceeds to operation 610 when sufficient resources are available in the resource allocation to include the channel coefficient selected in operation 606. Otherwise, the operational control flow 600 proceeds to operation 612 when sufficient resources are not available in the resource allocation to include the channel coefficient selected in operation 606.

At operation 610, the operational control flow 600 includes the channel coefficient selected in operation 606 in the compact CSI when sufficient resources are available. The operational control flow 600 updates the available resources of operation 608 by reducing these available resources by the data length of the channel coefficient selected in operation 606. Thereafter, the operational control flow 600 reverts to operation 606 to select another channel coefficient from among the channel coefficients.

At operation 612, the operational control flow 600 excludes the channel coefficient selected in operation 606 from the compact CSI when sufficient resources are not available. The operational control flow 600 has utilized the resource allocation for the spatial layer from operation 602. Thereafter, the operational control flow 600 reverts to operation 602 to select another spatial layer.

Figure 7:
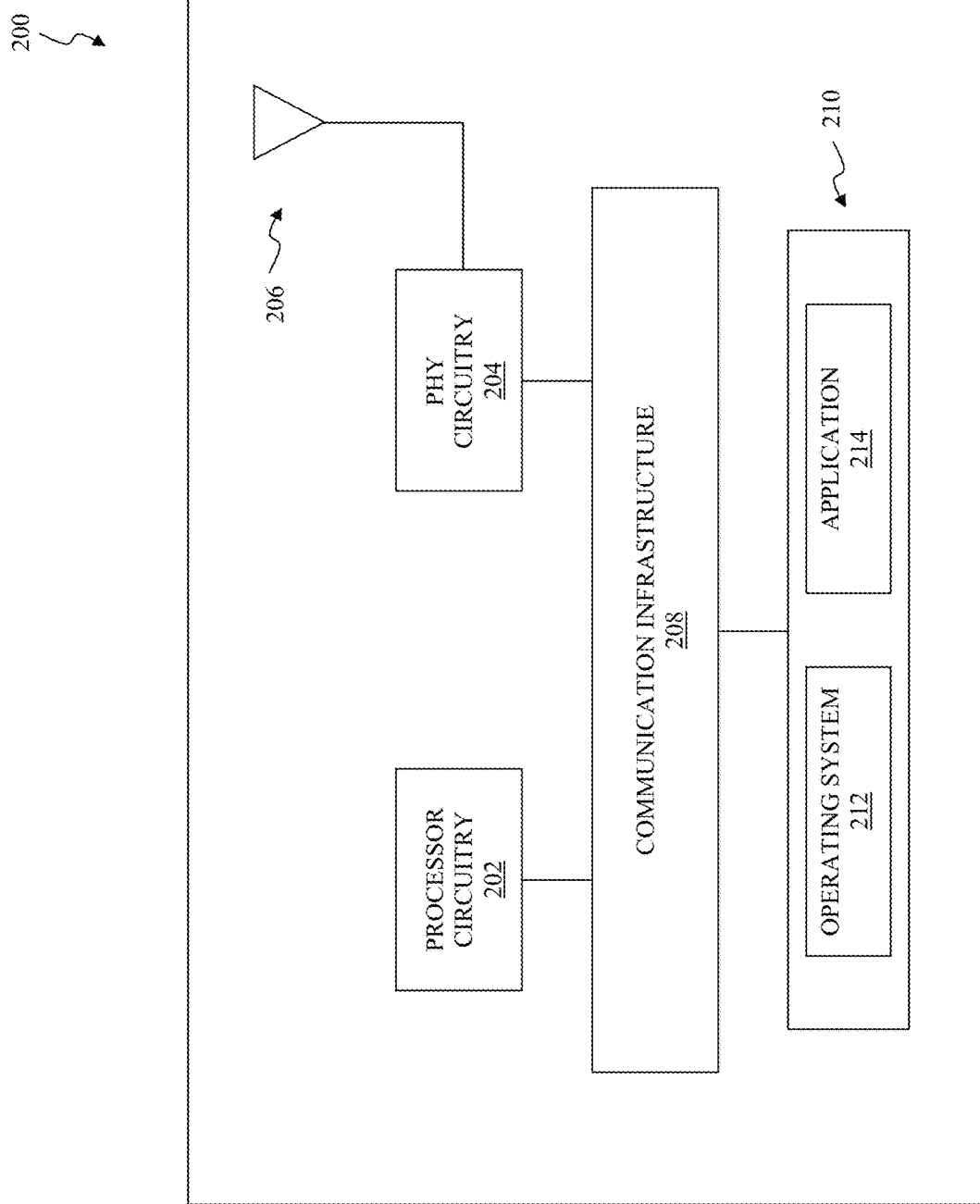
FIG. 7 illustrates a block diagram of exemplary wireless systems of electronic devices according to some embodiments of the disclosure.

Exemplary User Equipment (UE) for Implementing the Exemplary Channel State Information (CSI) Omission Procedures FIG. 7 illustrates a block diagram of exemplary wireless systems of electronic devices according to some embodiments of the disclosure. In the exemplary embodiment illustrated in FIG. 7, a wireless system 700 of the electronic device can include processor circuitry 702, physical layer (PHY) circuitry 704, an antenna array 706, a communication infrastructure 708, and a memory subsystem 710. The wireless system 700 as illustrated in FIG. 7 can be implemented as a standalone, or a discrete device, and/or can be incorporated within or coupled to another electrical device, or host device, such as a wireless communication device, a smart phone, a laptop computing device, a desktop computing device, a tablet computing device, a personal assistants, a monitor, a television, a wearable device, and/or any other suitable electronic device that will be apparent to those skilled in the relevant art(s) without departing from the spirit and scope of the disclosure. The wireless system 700 as illustrated in FIG. 7 can represent an exemplary embodiment of the UE 104 and/or one or more of the one or more of the electronic devices 108.1 through 108.*n* as described above in FIG. 1.

In the exemplary embodiment illustrated in FIG. 7, the processor circuitry 702 can include, or can be, any of a microprocessor, graphics processing unit, or digital signal processor, and their electronic processing equivalents, such as an Application Specific Integrated Circuit (ASIC) or Field Programmable Gate Array (FPGA). The processor circuitry 702 signifies one or more tangible data and information processing devices that physically transform data and information, typically using a sequence transformation, also referred to as an operational control flow, such as the operational control flow 600 as described above in FIG. 6. Data and information can be physically represented by an electrical, magnetic, optical or acoustical signal that is capable of being stored, accessed, transferred, combined, compared, or otherwise manipulated by the processor circuitry 702. The processor circuitry 702 can signify a singular processor and multi-core systems or multi-processor arrays, including graphic processing units, digital signal processors, digital processors or combinations of these elements. In some embodiments, the processor circuitry 702 can execute one or more elements of a protocol stack, for example one or more elements of a 5G protocol stack as to be described below in further detail.

As to be described in further detail below, the PHY circuitry 704 and the antenna array 706 can receive one or more communication signals traversing through a communication channel, for example, the communication channel 152 and/or the MIMO communication channel 206. The processor circuitry 702 can estimate one or more known parameters, characteristics, and/or attributes of the communication channel, for example, scattering, fading, and/or power decay over distance, through a process referred to as channel estimation. The processor circuitry 702 can develop various channel coefficients, for example, amplitudes and/or phases, describing the channel response of the communication channel at discrete intervals of time, also referred to as taps, as described above in FIG. 4 and FIG. 5. Thereafter, the processor circuitry 702 can assign priorities to these taps and thereafter utilize these priorities of these taps to selectively include or exclude their corresponding channel coefficients within the CSI report to develop a compact CSI report as described above in FIG. 6

The PHY circuitry 704 includes circuitry and/or control logic to carry out various radio/network protocol and radio control functions that enable communication with one or more radio networks. For example, the PHY circuitry 704 and the antenna array 706, to be described in further detail below, can receive one or more communication signals, for example, a demodulation reference signal (DMRS), a phase-tracking reference signal (PTRS), a sounding reference signal (SRS), or a channel-state information reference signal (CSI-RS), traversing through a communication channel, for example, the communication channel 152 and/or the MIMO communication channel 206. As another example, the PHY circuitry 704 can carry out various radio/network protocol and radio control functions to provide the CSI report within the uplink resource grid of the PUCCH or the PUSCH allocated by a radio access node (RAN), such as the RAN 106 as described above in FIG. 1. The radio control functions can include, but are not limited to, signal modulation/demodulation, encoding/decoding, and/or radio frequency shifting to provide some examples. In some embodiments, the PHY circuitry 704 can perform Fast-Fourier Transform (FFT), pre-coding, and/or constellation mapping/de-mapping functionality. In some embodiments, the PHY circuitry 704 can perform convolution, tail-biting convolution, turbo, Viterbi, and/or Low Density Parity Check (LDPC) encoding/decoding. In the exemplary embodiment illustrated in FIG. 7, the PHY circuitry 704 can process baseband signals received from the communication infrastructure 708 and to generate baseband signals for the communication infrastructure 708. In some embodiments, the PHY circuitry 704 can connect to and communicate on wireline and/or wireless networks. For example, the PHY circuitry 704 can include a wireless subsystem, for example, cellular subsystem, a WLAN subsystem, and/or a Bluetooth™ subsystem, having various wireless radio transceiver and wireless protocol(s) as will be understood by those skilled in the relevant art(s) without departing from the sprit and scope of the disclosure. The wireless subsystem can include circuitry and/or control logic for connecting to and communicating on wireless networks. The wireless networks can include cellular networks such as, but are not limited to, 3G/4G/5G wireless networks, Long-Term Evolution (LTE) wireless networks, and the like to provide some examples.

In some embodiments, the processor circuitry 702 and/or the PHY circuitry 704 can execute the 5G protocol stack having at least a 5G layer-1, a 5G layer-2, and a 5G layer-3. The 5G layer-1 can include a physical (PHY) layer. The PHY layer can transmit and/or receive physical layer signals over one or more physical channels that may be received from and/or transmitted to the one or more radio networks. The PHY layer can further perform link adaptation or adaptive modulation and coding (AMC), power control, cell search (for example, initial synchronization and handover purposes), and other measurements used by higher layers, such as the RRC layer. The PHY layer can further perform error detection on one or more transport channels, forward error correction (FEC) coding/decoding of the one or more transport channels, modulation/demodulation of the one or more physical channels, interleaving, rate matching, mapping onto the one or more physical channels, and Multiple Input Multiple Output (MIMO) antenna processing. In some embodiments, the PHY layer can process requests from and provide indications to the MAC layer over one or more transport channels.

The 5G layer-2 can include a Medium Access Control (MAC) layer, a Radio Link Control (RLC) layer, and a Packet Data Convergence Protocol (PDCP) layer. The MAC layer processes requests from, and provides indications to, the RLC layer over one or more logical channels. The MAC layer can perform mapping between the one or more logical channels and the one or more transport channels, multiplexing of MAC Service Data Units (SDUs) from one or more logical channels onto Transport Blocks (TBs) to be delivered to the PHY layer via the one or more transport channels, de-multiplexing the MAC SDUs to one or more logical channels from TBs delivered from the PHY layer via the one or more transport channels, multiplexing the MAC SDUs onto TBs, scheduling information reporting, error correction through HARQ, and logical channel prioritization. The RLC layer processes requests from and provides indications to the PDCP layer over one or more RLC channels. The RLC 930 may operate in a plurality of modes of operation, including: Transparent Mode (TM), Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer processes requests from and provides indications to the RRC layer over one or more radio bearers. The PDCP layer may execute header compression and decompression of Internet Protocol (IP) data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations such as ciphering, deciphering, integrity protection, and/or integrity verification to provide some examples.

The 5G layer-3 can include the Radio Resource Control (RRC) layer. The RRC layer configures aspects of the 5G layer-1, the 5G layer-2, and/or the 5G layer-3. The RRC layer can include broadcast of system information, broadcast of system information related to the access stratum (AS), paging, establishment, maintenance and release of RRC connection between UEs and access nodes, for example, RRC connection paging, RRC connection establishment, RRC connection modification, and RRC connection release, establishment, configuration, maintenance and release of point to point Radio Bearers, security functions including key management, inter-RAT mobility, and measurement configuration for UE measurement reporting.

The antenna array 706 can include one or more antenna elements, such as the transmitting antennas 208.1 through 208.$a$ and/or the receiving antennas 210.1 through 210.$b$ as described above in FIG. 2, each of which is capable of converting electrical signals into radio waves to traverse through a communication channel, for example, the communication channel 152 and/or the MIMO communication channel 206.

The memory subsystem 710 includes a number of memories including a main random-access memory (RAM), or other volatile storage device, for storage of instructions and data during program execution and/or a read only memory (ROM) in which instructions are stored. The memory subsystem 710 can provides persistent storage for program and data files, and may include a hard disk drive, a floppy disk drive along with associated removable media, a CD-ROM drive, an optical drive, a flash memory, or removable media cartridges. In the exemplary embodiment illustrated in FIG. 7, the memory subsystem 710 can optionally include an operating system 712 and an application 714. The operating system 712 can be Microsoft's Windows, Sun Microsystems's Solaris, Apple Computer's MacOs, Linux or UNIX to provide some examples. The computer system also typically can include a Basic Input/Output System (BIOS) and processor firmware. The operating system, the BIOS, and/or the firmware can be used by the processor circuitry 702 to control the PHY circuitry 704, the antenna array 706, the communication infrastructure 708, and/or the memory subsystem 710. In some embodiments, the operating system 712 maintains one or more network protocol stacks, such as an Internet Protocol (IP) stack, and/or a cellular protocol stack to provide some examples, that can include a number of logical layers. At corresponding layers of the protocol stack, the operating system 712 includes control mechanism and data structures to perform the functions associated with that layer. The application 714 can include applications, for example, used by the wireless system 700 and/or a user of wireless system 700. The applications in application 254 can include applications such as, but not limited to, Siri™, FaceTime™, radio streaming, video streaming, remote control, and/or other user applications which will be recognized by those skilled in the relevant art(s) without departing from the spirit and scope of the disclosure.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the disclosure should not be limited by any of the above-described exemplary embodiments, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for communicating channel state information (CSI), the method comprising:
   receiving, by a User Equipment (UE) from a radio access network (RAN), a communication signal traversing through a communication channel;
   developing, by the UE, a plurality of channel coefficients describing a channel response of the communication channel at a plurality of discrete intervals of time;
   assigning, by the UE, the plurality of channel coefficients to corresponding priorities from among a plurality of priorities;
   selectively including or excluding, by the UE, channel coefficients from among the plurality of channel coefficients into a CSI report based upon the corresponding priorities; and
   transmitting, by the UE to the RAN, the CSI report.

2. The method of claim 1, wherein the assigning comprises:
   assigning a most significant channel coefficient from among the plurality of channel coefficients to a highest priority from among the plurality of priorities; and
   assigning other channel coefficients from among the plurality of channel coefficients to other priorities from among the plurality of priorities based upon their corresponding tap distances from a most significant tap of the most significant channel coefficient.

3. The method of claim 2, wherein channel coefficients from among the plurality of channel coefficients having tap distances further away from the most significant tap of the most significant channel coefficient are assigned to lower priorities from among the plurality of priorities when compared to channel coefficients from among the plurality of channel coefficients having tap distances closer to the most significant tap of the most significant channel coefficient.

4. The method of claim 2, wherein the assigning the other channel coefficients comprises:
   executing, by the UE, a prioritization algorithm to assign the corresponding priorities to channel coefficients from among the plurality of channel coefficients having tap distances equidistant to the most significant tap of the most significant channel coefficient.

5. The method of claim 4, wherein the channel coefficients having tap distances equidistant to the most significant channel coefficient comprise:
   a first channel coefficient whose tap is prior to the most significant tap of the most significant channel coefficient, and
   a second channel coefficient whose tap is after the most significant tap of the most significant channel coefficient, and
   wherein the executing the prioritization algorithm comprises:

executing the prioritization algorithm to assign the first channel coefficient to a higher priority than the second channel coefficient.

6. The method of claim 4, wherein the channel coefficients having tap distances equidistant to the most significant channel coefficient comprise:
a first channel coefficient whose tap is prior to the most significant tap of the most significant channel coefficient, and
a second channel coefficient whose tap is after the most significant tap of the most significant channel coefficient, and
wherein the executing the prioritization algorithm comprises:
executing the prioritization algorithm to assign the first channel coefficient to a lower priority than the second channel coefficient.

7. The method of claim 1, wherein the selectively including or excluding comprises:
selecting a channel coefficient from among the plurality of channel coefficients;
determining whether sufficient resources are available in a resource allocation for the CSI report to include the channel coefficient in the CSI report;
including the channel coefficient in the CSI report when the sufficient resources are available; and
excluding the channel coefficient from the CSI report when the sufficient resources are not available.

8. A User Equipment (UE) for communicating channel state information (CSI), the UE comprising:
physical layer (PHY) circuitry configured to receive, from a radio access network (RAN), a communication signal traversing through a communication channel; and
processor circuitry configured to:
develop a plurality of channel coefficients describing a channel response of the communication channel at a plurality of discrete intervals of time,
assign the plurality of channel coefficients to corresponding priorities from among a plurality of priorities, and
selectively include or exclude channel coefficients from among the plurality of channel coefficients into a CSI report based upon the corresponding priorities,
wherein the PHY circuitry is further configured to transmit the CSI report to the RAN.

9. The UE of claim 8, wherein the processor circuitry is configured to:
assign a most significant channel coefficient from among the plurality of channel coefficients to a highest priority from among the plurality of priorities; and
assign other channel coefficients from among the plurality of channel coefficients to other priorities from among the plurality of priorities based upon their corresponding tap distances from a most significant tap of the most significant channel coefficient.

10. The UE of claim 9, wherein channel coefficients from among the plurality of channel coefficients having tap distances further away from the most significant tap of the most significant channel coefficient are assigned to lower priorities from among the plurality of priorities when compared to channel coefficients from among the plurality of channel coefficients having tap distances closer to the most significant tap of the most significant channel coefficient.

11. The UE of claim 9, wherein the processor circuitry is configured to:
execute a prioritization algorithm to assign the corresponding priorities to channel coefficients from among the plurality of channel coefficients having tap distances equidistant to the most significant tap of the most significant channel coefficient.

12. The UE of claim 11, wherein the channel coefficients having tap distances equidistant to the most significant tap of the most significant channel coefficient comprise:
a first channel coefficient whose tap is prior to the most significant tap of the most significant channel coefficient, and
a second channel coefficient whose tap is after the most significant tap of the most significant channel coefficient, and
wherein the processor circuitry is configured to execute the prioritization algorithm to assign the first channel coefficient to a higher priority than the second channel coefficient.

13. The UE of claim 11, wherein the channel coefficients having tap distances equidistant to the most significant tap of the most significant channel coefficient comprise:
a first channel coefficient whose tap is prior to the most significant tap of the most significant channel coefficient, and
a second channel coefficient whose tap is after the most significant tap of the most significant channel coefficient, and
wherein the processor circuitry is configured to execute the prioritization algorithm to assign the first channel coefficient to a lower priority than the second channel coefficient.

14. The UE of claim 8, wherein the processor circuitry is configured to:
select a channel coefficient from among the plurality of channel coefficients;
determine whether sufficient resources are available in a resource allocation for the CSI report to include the channel coefficient in the CSI report;
include the channel coefficient in the CSI report when the sufficient resources are available; and
exclude the channel coefficient from the CSI report when the sufficient resources are not available.

15. An access node for communicating channel state information (CSI), the access node comprising:
processor circuitry configured to:
allocate a plurality of resources within a communication channel to be utilized by a User Equipment (UE) to provide a CSI report, and
trigger the UE to provide the CSI report associated with a communication signal that traverses through the communication channel; and
physical layer (PHY) circuitry configured to receive the CSI report from the UE,
wherein the CSI report includes a first plurlaity of channel coefficients from among a plurlaity of channel coefficients describing a channel response of the communication channel at a plurality of discrete intervals of time,
wherein the plurality of channel coefficients are assigned corresponding priorities from among a plurality of priorities,
wherein the first plurlaity of channel coefficients are selectively included within the CSI report based upon their corresponding priorities from among the plurality of priorities and the plurality of resources allocated by a radio access network (RAN), and
wherein a second plurlaity of channel coefficients from among the plurlaity of channel coefficients are selectively excluded form the CSI report based upon their corresponding priorities from among the plurality of priorities and the plurality of resources allocated by the RAN.

16. The access node of claim 15, wherein a most significant channel coefficient from among the first plurality of channel coefficients is assigned to a highest priority from among the plurality of priorities, and
wherein other channel coefficients from among the first plurality of channel coefficients are assigned to other priorities from among the plurality of priorities based upon their corresponding tap distance from a most significant tap of the most significant channel coefficient.

17. The access node of claim 16, wherein channel coefficients from among the plurality of channel coefficients having tap distances further away from the most significant tap of the most significant channel coefficient are assigned to lower priorities from among the plurality of priorities when compared to coefficients from among the plurality of channel coefficients having tap distances closer to the most significant tap of the most significant channel coefficient.

18. The access node of claim 16, wherein the corresponding priorities are assigned to channel coefficients from among the plurality of channel coefficients having tap distances equidistant to the most significant tap of the most significant channel coefficient using a prioritization algorithm.

19. The access node of claim 18, wherein the channel coefficients having tap distances equidistant to the most significant tap of the most significant channel coefficient comprise:
a first channel coefficient whose tap is prior to the most significant tap of the most significant channel coefficient, and
a second channel coefficient whose tap is after the most significant tap of the most significant channel coefficient, and
wherein the first channel coefficient is assigned to a higher priority than the second channel coefficient using the prioritization algorithm.

20. The access node of claim 18, wherein the channel coefficients having tap distances equidistant to the most significant tap of the most significant channel coefficient comprise:
a first channel coefficient whose tap is prior to the most significant tap of the most significant channel coefficient, and
a second channel coefficient whose tap is after the most significant tap of the most significant channel coefficient, and
wherein the first channel coefficient is assigned to a lower priority than the second channel coefficient using the prioritization algorithm.

* * * * *